2,732,367

POLYEPOXIDES REACTED WITH A PHOSPHONIC ACID

Edward C. Shokal, Walnut Creek, Calif., assignor to Shell Development Company, Emeryville, Calif., a corporation of Delaware No Drawing. Application August 31, 1953, Serial No. 377,693

18 Claims. (Cl. 260—47)

This invention relates to a new class of phosphorus-containing resinous products. More particularly, the invention relates to new fusible and soluble phosphorus-containing resinous products prepared from polyepoxides, and to the cross-linked insoluble infusible products prepared therefrom.

Specifically, the invention provides new and useful fusible and soluble phosphorus-containing resinous products prepared by reacting a polyepoxide, and preferably a low molecular weight glycidyl polyether of a polyhydric phenol or polyhydric alcohol, with a phosphonic acid. The invention further provides valuable insoluble infusible products obtained by reacting the above-described fusible and soluble products with a cross-linking agent.

Polyepoxides, such as those obtained by reacting epichlorohydrin with polyhydric phenols, are promising materials for use in preparing industrial products as they may be easily cured to form resins that are very hard and durable and have excellent electrical resistivity and inertness to chemicals. The polyepoxides in some instances, however, fail to have all of the properties desired for certain application and efforts have been made to modify the resins so as to include the desired properties. For many applications, for example, it would be desirable to have products having more flexibility and better flame resistance and improved fiber-forming properties. The efforts made in the past to modify the polyepoxides to obtain such properties have, however, not been too successful. In most cases, the added modifying agents destroy all of the reactive epoxide groups or cause a rapid gellation of the product, and form hard, insoluble, infusible products without effecting any change in the desired properties of the resin.

It is, therefore, an object of the invention to provide a new class of resinous materials from polyepoxides. It is a further object to provide a new class of modified polyepoxide resins which are still fusible and soluble and possess many of the above-described improved properties. It is a further object to provide phosphorus-containing polyepoxide products which have improved flame resistance. It is a further object to provide phosphorus-containing polyepoxide products which can be melt spun to form fibers and filaments. It is a further object to provide phosphorus-containing polyepoxide products which may be cured to form products having improved flexibility. It is a further object to provide phosphorus-containing polyepoxides which may be further treated with monofunctional or polyfunctional agents to produce valuable derivatives. It is a further object to provide phosphorus-containing polyepoxides which are valuable in the preparation of pottings and castings, and improved surface coating and adhesive compositions. Other objects and advantages of the invention will be apparent from the following detailed description thereof.

It has now been discovered that these and other objects may be accomplished by the novel products of the invention comprising resinous materials obtained by reacting a polyepoxide, and preferably a low molecular weight glycidyl ether of a polyhydric phenol or polyhydric alcohol, with a phosphonic acid. Surprisingly, the products prepared in this manner are still soluble and fusible and cannot be converted to the insoluble infusible state except by subsequent treatment with cross-linking agents, the products obtained by reacting the polyepoxides with other phosphorus-containing acids, on the other hand, being hard insoluble infusible products. The products prepared in this manner also possess an unexpected improvement in flame resistance and are far superior in this regard than the products obtained by reacting the polyepoxides with phosphoric acid or phosphoric acid esters. The products prepared from an equivalent or excess amount of the polyepoxides also possess unexpected fiber-forming properties and can be melt spun to form fibers that are pliable and strong and have excellent dyeing characteristics.

It has been further discovered that the above-described resinous products of the invention possess reactive hydroxyl groups and in many cases reactive epoxide and phosphonic acid groups and may be further reacted with monofunctional agents, such as monocarboxylic acids, to produce improved fusible and soluble products, or may be treated with polyfunctional derivatives, such as diisocyanates, urea-formaldehyde resins, dialdehydes and polycarboxylic acids or anhydrides, to produce other new and valuable products. Many of these derivatives are valuable in the preparation of pottings and castings for electrical apparatus, surface coating compositions, adhesive and impregnating compositions, and the like as described hereinafter.

The polyepoxides used in the preparation of the novel products of the invention comprise all those organic compounds containing at least two reactive epoxy

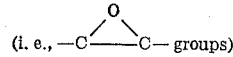

(i. e., $-\overset{\diagup \mathrm{O} \diagdown}{\mathrm{C}\text{———}\mathrm{C}}-$ groups)

groups in their molecule. The polyepoxides may be saturated or unsaturated, aliphatic, cycloaliphatic, aromatic or heterocyclic and may be substituted if desired with non-interfering substituents. The polyepoxides may be monomeric or polymeric.

For clarity, many of the polyepoxides will be referred to hereinafter in terms of their epoxy equivalency. The term "epoxy equivalency" refers to the number of epoxy groups contained in the average molecule of the desired material. The epoxy equivalency is obtained by dividing the average molecular weight of the polyepoxides by the epoxide equivalent weight. The epoxide equivalent weight is determined by heating a one-gram sample of the polyepoxide with an excess of pyridinium chloride dissolved in pyridine at the boiling point for twenty minutes. The excess pyridinium chloride is then back titrated with 0.1 N sodium hydroxide to phenolphthalein end point. The epoxide value is calculated by considering one HCl as an equivalent of one epoxide. This method is used to obtain all epoxide values reported herein.

If the polyepoxides are single monomeric compounds having all of their epoxide groups intact, their epoxy equivalency will be whole integers, such as 2, 3, 4, and 5. However, in the case of the polymeric-type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5 and the like.

The monomeric-type polyepoxide compounds may be exemplified by the following: vinyl cyclohexene dioxide, epoxidized soyabean oil, butadiene dioxide, 1,4-bis(2,3-epoxypropoxy)benzene, 1,3-bis(2,3-epoxypropoxy)benzene, 4,4'-bis(2,3-epoxypropoxy)diphenyl ether, 1,8-bis-(2,3-epoxypropoxy)octane, 1,4-bis(2,3-epoxypropoxy)-cyclohexane, 4,4'-bis(2-hydroxy-3,4-epoxybutoxy)-diphenyldimethylmethane, 1,3-bis(4,5-epoxypentoxy)-5-chlorobenzene, 1,4-bis(3,4-epoxybutoxy)-2-chlorocyclohexane, diglycidyl ether, 1,3-bis(2-hydroxy-3,4-epoxybutoxy)benzene, 1,4-bis(2-hydroxy-4,5-epoxypentoxy)-benzene, 1,2,5,6-diepoxy-3-hexyne, 1,2,5,6-diepoxyhexane, 1,2,3,4-tetra(2-hydroxy-3,4-epoxybutoxy)butane, and epoxy-substituted materials obtained by reacting diisocyanates with glycidol, such as, for example, compounds of the formula

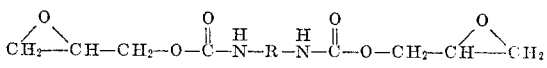

wherein R is a bivalent organic radical.

Other examples of this type include the glycidyl polyethers of the polyhydric phenols obtained by reacting a polyhydric phenol with a great excess, e. g., 4 to 8 mol excess, of a halogen-containing epoxide in an alkaline medium. Thus, polyether A described hereinafter, which is substantially 2,2-bis(2,3-epoxypropoxyphenyl)propane is obtained by reacting bis-phenol (2,2-bis(4-hydroxyphenyl)propane) with an excess of epichlorohydrin as indicated below. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydroxybenzophenone, bis(4-hydroxyphenyl)ethane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane, and the like.

Examples of the polymeric type polyepoxides include the polyepoxypolyhydroxy polyethers obtained by reacting, preferably in an alkaline or an acid medium, a polyhydric alcohol or polyhydric phenol with a polyepoxide such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A further group of the polymeric polyepoxides comprises the hydroxy-substituted polyepoxy polyethers obtained by reacting, preferably in an alkaline medium, a slight excess, e. g., .5 to 3 mol excess, of a halogen-containing epoxide as described above, with any of the aforedescribed polyhydric phenols, such as resorcinol, catechol, bis-phenol, bis(2,2'-dihydroxy-dinaphthyl)methane, and the like.

Also included within this group are the polyepoxy polyethers obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol, and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl 2,3-epoxypropyl ether), poly(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxystyrene).

Coming under special consideration, particularly because of the fine properties of the resulting reaction products are the monomeric and polymeric-type glycidyl polyethers of dihydric phenols obtained by reacting epichlorohydrin with a dihydric phenol in an alkaline medium. The monomeric products of this type may be represented by the general formula

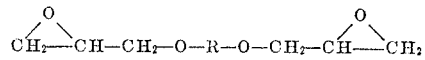

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyether will be illustrated below. Unless otherwise specified, parts indicated are parts by weight.

PREPARATION OF GLYCIDYL POLYETHERS OF DIHYDRIC PHENOLS

*Polyether A*

About 2 mols of bis-phenol was dissolved in 10 mols of epichlorohydrin and 1 to 2% water added to the resulting mixture. The mixture was then brought to 80° C. and 4 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as Polyether A.

Polyether B

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value eq./100 g. of 0.40 so the epoxy equivalency was 1.9. For convenience, this product will be referred to as Polyether B.

Polyether C

About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at a temperature of 130° C. The Durrans' Mercury Method melting point of the resulting product is 52° C. and the molecular weight is about 710. The product has an epoxy value of 0.27 eq./100 g. so the epoxy equivalency is 1.9.

Polyether D

By using a smaller ratio of epichlorohydrin to bis-phenol a glycidyl polyether of higher melting point was obtained. Thus, Polyether D was obtained in the same manner as Polyether C except that for every mol of bis-phenol, there was used 1.57 mols of epichlorohydrin and 1.88 mols of sodium hydroxide. This provided a product having a melting point of about 70° C., a molecular weight of 900, and an epoxide value of 0.20 eq./100 g.

Polyether E

This glycidyl polyether of still higher melting point was prepared in like manner to that of Polyether B except that for each mol of bis-phenol there was employed 1.22 mols of epichlorohydrin and 1.37 mols of sodium hydroxide. The resulting product had a melting point of 98° C., a molecular weight of 1400 and an epoxide value of 0.103 eq./100 g.

Glycidyl polyethers of higher molecular weight and softening point are best prepared by reacting a lower polyether with less than an equimolecular amount of dihydric phenol. Thus upon heating the above-noted product which has a softening point of 98° C. to a temperature of about 150° C. and then adding 5% by weight of bis-phenol after which the temperature is gradually increased to 190° C. in about 30 minutes followed by maintaining the temperature at this point for an additional 1½ hours, there is obtained a glycidyl polyether having a softening point of 131° C., an epoxy value of 0.05 equivalent of epoxy per 100 grams and a molecular weight of 2900.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 300 and 900. Particularly preferred are those having a Durrans' Mercury Method softening point no greater than 60° C.

The glycidyl polyethers of polyhydric phenols obtained by condensing the polyhydric phenols with epichlorohydrin are also referred to as "ethoxyline" resins. See Chemical Week, vol. 69, page 27, for September 8, 1951.

Also of special interest are the polyglycidyl polyethers of polyhydric alcohols obtained by reacting a polyhydric alcohol with epichlorohydrin or glycerol dichlorohydrin in the presence of a catalyst and dehydrochlorinating the resulting product. A detailed description of a method for preparing these particular polyglycidyl polyethers may be found in Zech—U. S. 2,581,464. Special catalysts that may be used for the reaction of the polyhydric alcohol and epichlorohydrin are described in Marple et al.—U. S. 2,260,753 and U. S. 2,327,053.

As indicated in the Zech patent, products obtained by the reaction of the polyhydric alcohols and epichlorohydrin or glycerol dichlorohydrin followed by dehydrochlorination may be described as polyether polyepoxide reaction products which in general contain at least three non-cyclic ether (—O—) linkages, terminal epoxide-containing ether

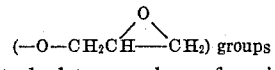

groups and halogen attached to a carbon of an intermediate

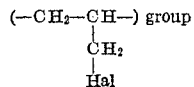

These halogen-containing polyether polyepoxide reaction products obtainable by partial dehydrohalogenation of polyhalohydrin alcohols may be considered to have the following general formula:

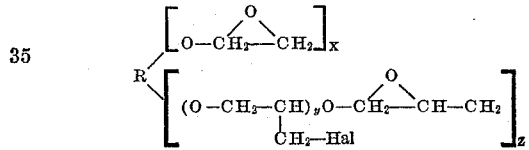

in which R is the residue of the polyhydric alcohol which may contain unreacted hydroxyl groups, X indicates one or more of the epoxy ether groups attached to the alcohol residue, y may be one or may vary in different reaction products of the reaction mixture from zero to more than one, and Z is one or more, and $X+Z$, in the case of products derived from polyhydric alcohols containing three or more hydroxyl groups, averages around two or more so that the reaction product contains on the average two or more than two terminal epoxide groups per molecule.

The preparation of the polyglycidyl ethers of polyhydric alcohols may be illustrated below.

PREPARATION OF GLYCIDYL POLYETHERS OF POLYHYDRIC ALCOHOLS

Polyether F

About 276 parts (3 mols) of glycerol was mixed with 832 parts (9 mols) epichlorohydrin. To this reaction mixture was added 10 parts of diethyl ether solution containing about 4.5% boron trifluoride. The temperature rose as a result of the exothermic reaction and external cooling with ice water was applied to keep the temperature between about 50° C. and 75° C. during a reaction period of about three hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in dioxane solution. The epoxy equivalency of this product was, therefore, about 2.13. For convenience, this product will be referred to hereinafter as Polyether F.

Particularly preferred members of this group comprise the glycidyl polyethers of the aliphatic polyhydric alcohols containing from 2 to 10 carbon atoms, and more preferably the alkanediols and alkanetriols containing from 2 to 8 carbon atoms. Such products preferably having an epoxy equivalency between 1.0 and 2.5 and a molecular weight between 300 and 1000.

Also coming under special consideration, particularly because the products prepared therefrom contain both sulfur and phosphorus atoms and are suited for use as special stabilizers, lubricants and the like, are the polyepoxides containing a sulfide or polysulfide linkage, such as bis(2,3-epoxypropyl)sulfide, 1,2,11,12-diepoxy-4,9-dithiadodecane, the polyglycidyl thioether of bis-phenol, the polyglycidyl thioether of resorcinol, and products obtained by reacting an excess of the above-described polyepoxides with hydrogen sulfide.

The phosphonic acids to be reacted with the above-described polyepoxides may be any mono- or polyphosphonic acid such as, for example, those of the formula

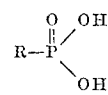

or

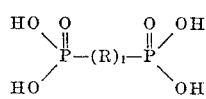

wherein R is a monovalent and $R_1$ a divalent, aliphatic, cycloaliphatic, aromatic or heterocyclic radical which may be saturated or unsaturated and/or substituted with noninterfering substituents, such as halogen atoms, ether and ester radicals, and the like. Examples of such phosphonic acids include, among others, benzenephosphonic acid, cyclohexanephosphonic acid, propanephophonic acid, methanediphosphonic acid, cyclohexenephosphonic acid, dichlorobutanephosphonic acid, butanediphosphonic acid, methoxymethanephosphonic acid, xylenephosphonic acid, 2-hexenephosphonic acid, tetradecanephosphonic acid, 3,5-dichlorodecanephosphonic acid, 2,3,4-trimethylpentanephosphonic acid, and chlorocyclohexanephosphonic acid.

Phosphonic acids wherein the oxygen atom attached to the phosphorus atom has been replaced by a sulfur, selenium or tellurium atom may also be employed and are preferred for certain specialized applications. When the oxygen atom attached to the phosphorus atom through the double bond is replaced by the sulfur, selenium or tellurium atom, the compounds will be named herein by placing the term "thiono," "selenono" and "tellurnono," respectively, before the acid name, and when the oxygen atom joined to the phosphorus atom through the single bond is replaced by the sulfur, selenium or tellurium atom, the compounds will be named by placing the term "thio," "seleno" and "tellurno" before the name of the acid. Examples of these phosphonic acids include, among others, benzenethionophosphonic acid, benzeneselenonophosphonic acid, butanetellurnophosphonic acid, benzenethiophosphonic acid, tetradecanethionophosphonic acid and xylenetellurnophosphonic acid.

Preferred phosphonic acids are those of the group consisting of (1) monophosphonic acids of the formula

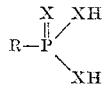

wherein R is a member of the group consisting of monovalent hydrocarbon and heterocyclic radicals and halogen, ether and ester substituted derivatives thereof, and X is a member of the group consisting of oxygen, sulfur, selenium and tellurium, and (2) polyphosphonic acids of the formula

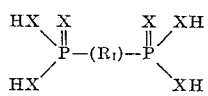

wherein $R_1$ is a member of the group consisting of bivalent hydrocarbon and heterocyclic radicals and halogen, ether and ester substituted derivatives thereof, and X is a member of the group consisting of oxygen, sulfur, selenium and tellurium.

Particularly preferred phosphonic acids to be employed in preparing the novel products of the invention comprise the hydrocarbon-substituted monophosphonic acids and the halohydrocarbon-substituted monophosphonic acids of the formula

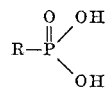

wherein R is a hydrocarbon or halohydrocarbon radical containing no more than 20 carbon atoms, such as benzenephosphonic acid, xylenephosphonic acid, toluenephosphonic acid, chlorobenzenephosphonic acid, chlorotoluenephosphonic acid, cyclohexanephosphonic acid, cyclopentanephosphonic acid, hexanephosphonic acid, decanephosphonic acid, octadecanephosphonic acid, and cyclohexenephosphonic acid. Coming under special consideration are the aromatic hydrocarbon-substituted monophosphonic acids and the mono-, di- and tri-chlorohydrocarbon-substituted monophosphonic acids containing not more than 12 carbon atoms, the alkane-substituted monophosphonic acids and the mono-, di- and trichloroalkane-substituted monophosphonic acids containing no more than 10 carbon atoms.

The proportions in which the polyepoxide and phosphonic acid are combined may vary over a wide range depending upon the properties desired in the finished product. If high molecular weight polymeric materials having fiber-forming properties are desired, the polyepoxide should be maintained in excess or in an amount which is at least chemically equivalent to the phosphonic acid. The expression "chemically equivalent" as used herein in reference to the polyepoxide and phosphonic acid refers to the amount required to furnish one epoxide group for every —OH group attached to the phosphorus atom in the phosphonic acid molecule. In producing the high molecular weight polymers, the polyepoxide and the phosphonic acid are preferably combined in equivalent ratios varying from 4:1 to 1:1, and more preferably from 3:1 to 1.5:1. Approximately chemical equivalent amounts of polyepoxide and phosphonic acid are the most ideal proportions to be used for preparing the high molecular weight products. If the phosphonic acid is maintained in excess, the products will be of lower molecular weight but may be terminated with the phosphonic acid molecules which in turn may be further reacted as shown hereafter. In the preparation of the lower molecular weight products, the polyepoxide and phosphonic acid are preferably combined in equivalent ratios varying from 1:20 to 1:2, and more preferably from 1:10 to 1:5.

In preparing the high molecular weight products of the invention, the phosphonic acid may be added all at once or it may be added in small increments over a period of time so that there will be ample opportunity for the formation of the long symmetrically arranged macromolecules. If the lower molecular weight products are desired, the phosphonic acid is preferably added all at one time, or if desired, the polyepoxide may be added in small increments to the phosphonic acid.

The reaction between the polyepoxide and the phosphonic acid may be effected by merely heating the two components together. It is generally preferred to employ temperatures within the range of about 65° C. to 200° C., but if the components are particularly reactive lower temperatures may be employed and if faster reaction rates are desired higher temperatures may be utilized.

The reaction may be conducted at atmospheric, superatmospheric or subatmospheric pressures. In the presence of the high molecular weight products, it is generally desirable to conduct the reaction at subatmospheric pressures.

The reaction may be conducted in the presence or absence of solvents or diluents. The solvents if employed may be a solvent for the reactants and the resinous product or a solvent for the reactants and a non-solvent for the resinous product. Suitable solvents include toluene, benzene, dioxane, cyclohexanone, tetrahydrofuran, and the like, and mixtures thereof.

Monofunctional components, such as monoepoxide, monomercaptans, monoesters of phosphonic acids and the like, may also be added to the reaction mixture to give modified products or to produce products having lower molecular weights. Such components may be exemplified by epichlorohydrin, 2,3-epoxypropoxybenzene, 2,3-epoxpropoxypentane, ethyl mercaptan, benzyl mercaptan, ethyl phosphonate, butyl phosphonate and the like. Such components are preferably added in minor quantities, such as from 0.1% to 10% by weight of the total reactants, depending upon the molecular weight type of product desired.

At the completion of the reaction, the resinous products may be recovered by a variety of methods obvious to one skilled in the art, such as solvent extraction, filtration, precipitation, distillation, and the like.

The products obtained by the above-described process vary from viscous liquid to solids depending on the types of materials and proportion of reactants employed. The products are fusible, i. e., are softened on heating, and have solubility in organic solvents, such as cyclohexanone, toluene, benzene and the like. The products of the invention are also characterized by their improved flame resistance as well as by the improved flexibility of curved films, etc., prepared therefrom.

As indicated above, the high molecular weight resinous products of the present invention can be melt spun into fibers. The spinning may be carried out by a variety of methods known to the art. For example, the polymer may be melted and then touched with a rod to draw away a filament. This filament may then be caught on a moving drum or reel and a continuous filament drawn from the molten mass until the latter is exhausted. Continuous filaments may also be produced by extruding the molten resinous product through an orifice and continuously collecting the extruded filament on rotating drums.

The resinous products of the invention may also be further reacted through the hydroxyl groups formed by the reaction of the phosphonic acid with the epoxide groups, and/or through the active epoxide or phosphonic acid groups with various reactants to produce valuable derivatives. They may be reacted, for example, with monocarboxylic acids, or their anhydrides, such as acetic acid, butyric, caproic, capric, 2-ethylhexanoic, lauric, stearic, benzoic, cyclohexanoic, isopropylbenzoic acid and tert-butyl benzoic acid to produce ester derivatives having valuable properties. Many of these ester derivatives produce products having better water resistance than those prepared from the resinous products themselves.

The resinous products may also be further reacted with mono- or polyethylenic monocarboxylic acids or their anhydrides to produce products having value in the preparation of coating compositions, such as varnishes and the like. Examples of such acids include, among others, acrylic acid, chloroacrylic acid anhydride, abietic acid, imparic acid, acids derived from linseed, soyabean, perilla, oiticica, tung, walnut, and dehydrated castor oil, as well as the lower fatty acids, such as pentadienoic, hexadienoic and decadienoic acids.

The resinous products of the invention may also be reacted with other reagents which act to cross-link the molecules through the active groups, such as the hydroxyl and epoxide groups. Among these materials are components, such as diisocyanates and diisothiocyanates, e. g., methylene bis(4-phenyl) isocyanate, diphenylmethane diisocyanate, trimethylene diisothiocyanate and propylidene-2,2-diisothiocyanates, dialdehydes, e. g., glyoxal, polycarboxylic acids, such as phthalic acid, phthalic acid anhydride, succinic acid, adipic acid, malonic acid, maleic acid, metal oxides, amines, such as triethylamine, ethylene diamine, diethylene triamine, and various resinous products, such as the amine-aldehyde or amide-aldehyde type resins, as those prepared from formaldehyde and amides or amines as urea, thiourea, hydroxy urea, acetyl urea, phenyl thiourea, and the like, and mixtures thereof. The amount of these agents employed will depend upon the type of resinous product and the agent selected, but in most cases, the desired hard infusible product may be obtained by using the agents in amounts varying from .1% to 40% by weight, and more preferably from .5% to 10% by weight.

The cured resinous products are of value in the preparation of pottings and castings for electrical apparatus. In the preparation of castings and pottings from these materials, it is generally desirable to combine the resinous product with the curing agent, and then pour this mixture into the mold or casting and then allow the mixture to stand. After a short period, the mixture sets up to the desired hard resin. Heat may also be applied to hasten the cure.

The cured resinous products are also of value in the preparation of hard infusible coating compositions. In this application, the resinous products are generally combined with curing agents, such as diisocyanates, urea-formaldehyde resins, and the like, in a common solvent or diluent and then the resulting mixture spread on the surface and allowed to stand in air or exposed to relatively high-baking temperatures.

The resinous products may also be combined with other film-forming materials to produce a great variety of surface coating compositions. Film-forming materials that can be used for this purpose include the drying oils, such as tung oil, linseed oil, dehydrated castor oil, soyabean oil, and the like, cellulose derivatives, such as cellulose nitrate, cellulose acetate, cellulose acetate butyrate, cellulose propionate, ethyl cellulose, methyl cellulose, butyl cellulose, cellulose acetopropionate, and the like, and the vinyl polymers, such as polymers, of vinyl chloride, vinylidene chloride, methyl methacrylate, ethyl acrylate, vinyl benzoate, diallyl phthalate, and the like, and mixtures thereof. Coating compositions of this type are generally prepared by merely mixing the film-forming material and the desired resinous products with a common solvent, such as cyclohexanone, benzene, toluene, and the like, and other desired ingredients, such as plasticizers, pigments, driers, and the like. These compositions may then be spread on the desired surface and air-dried or baked at relatively high temperatures.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

EXAMPLE I

This example illustrates the unexpected results obtained by reacting polyepoxides with phosphonic acids over the results obtained by reacting polyepoxides with other phosphorus-containing acids or derivatives.

(a) 198 parts of Polyether A produced above were combined with an approximately chemical equivalent amount (81.6 parts) of butyl dihydrogen phosphate and the mixture heated at 160° C. Under these conditions, the mixture rapidly jelled and set up to insoluble mass. The product could not be melted even when heated to 300° C.

(b) 198 parts of Polyether A produced above were combined with an approximately chemical equivalent amount (33 parts) of orthophosphoric acid and the mixture heated at 160° C. Under these conditions, the mixture rapidly jelled and set up to an insoluble mass. This product also could not be melted even when heated to 300° C.

(c) 198 parts of Polyether A produced above were combined with an approximately chemical equivalent amount (63.5 parts) of benzenephosphonic acid and the mixture heated at 160° C. The reaction set in rapidly and as the molecular weight rose the product set up to a solid. The solid melted when heated to 250° C. and was soluble in organic solvents. Further heating did not cross-link the product and the material could be converted to a hard insoluble infusible product only by heating with a cross-linking agent, such as a carboxylic acid or diisocyanate.

EXAMPLE II

This example illustrates some of the other properties of the Polyether A-benzenephosphonic acid reaction product produced in Example I.

(a) The Polyether A-benzenephosphonic acid reaction product was ignited but was able to sustain flame for only a few seconds. The Polyether A resin by itself, on the other hand, had poor flame resistance and burned very rapidly when ignited.

(b) The Polyether A-benzenephosphonic acid reaction product could also be drawn into fibers when melted at 250° C. The resulting fibers were very fine and strong and could be tied into knots.

(c) About 20 parts of the Polyether A-phosphonic acid reaction product was dissolved in cyclohexanone with 1.5 parts of hexamethylene diisocyanate and the mixture applied as a coating to steel panels. When baked at 150° C. the coating set up to a hard insoluble infusible coating having improved flexibility.

EXAMPLE III

About 66.2 parts of hydroquinone diglycidyl ether (epoxide value .755 eq./100 g.) were combined with 31.7 parts of benzenephosphonic acid and the mixture heated to 160° C. The reaction mixture rapidly thickened to form a fusible soluble solid. Strong fibers could be prepared from the product by melting it at 250° C., touching the melted mass with a rod and then drawing the fibers out into the air.

About 50 parts of the hydroquinone diglycidyl ether benzene phosphonic acid reaction product produced above were mixed with 2 parts of hexamethylene diisocyanate and the mixture heated to 250° C. The resulting product was a hard insoluble infusible solid.

EXAMPLE IV

About 131 parts of vinyl cyclohexene dioxide is combined with 63.5 parts of benzenephosphonic acid and the mixture heated to 160° C. The reaction mixture thickened to form a soft solid. The product melts on heating and is soluble in organic solvents.

Fifty parts of the vinyl cyclohexenedioxide-benzenephosphonic acid reaction product produced above is dissolved in warm cyclohexanone and mixed with 1 part of phthalic anhydride. This mixture is then spread on steel panels and heated to 150° C. to form hard insoluble infusible coatings having improved flexibility.

EXAMPLE V

About 146 parts of bis(2,3-epoxypropyl) sulfide is combined with 63.5 parts of benzenephosphonic acid and the mixture heated to 160° C. The resulting product is a soft fusible soluble solid.

About 50 parts of the bis(2,3-epoxypropyl) sulfide-benzenephosphonic acid reaction product produced above is combined with one part of hexamethylene diisocyanate in warm cyclohexanone and the mixture spread on steel panels. When baked at 150° C., the coatings are hard, insoluble and infusible.

EXAMPLE VI

About 200 parts of Polyether F produced above (a halogen-containing glycidyl polyether of glycerol having a molecular weight of about 324) is combined with 63.5 parts of benzenephosphonic acid and the mixture heated at 160° C. The resulting mixture sets up to a fusible soluble solid.

About 40 parts of the Polyether F-benzenephosphonic acid reaction product is combined with 40 parts of a urea-formaldehyde resin in a solvent comprising 45% xylene and 55% cyclohexanone and 5% butanol. This mixture is then cast on tin panels and dried for several hours at 110° C. to form hard insoluble infusible films.

EXAMPLE VII

About 50 parts of Polyether A and 50 parts of polyallyl glycidyl ether) are combined with 30 parts of cyclohexanephosphonic acid and the mixture heated to about 160° C. The resulting product is a soluble fusible resin. When heated with diphenylmethane diisocyanate, the resin is converted to a hard insoluble infusible product.

EXAMPLE VIII

A low molecular weight phosphorus-containing product is prepared by reacting 198 parts of Polyether A with over three times the chemical equivalent amount (190.5 parts) of benzenephosphonic acid and the mixture heated to 160° C. The resulting product is a low molecular weight viscous resin which could be further reacted with polyepoxides, such as Polyether A and Polyether F, to form higher molecular weight products which can be melt spun to form strong fibers and filaments.

I claim as my invention:

1. A phosphorus-containing resinous product obtained by heating at least one polyepoxide with a phosphonic acid group consisting of (1) monophosphonic acids of the formula

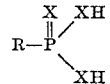

wherein R is a member of the group consisting of monovalent hydrocarbon and heterocyclic radicals and halogen, ether and ester substituted derivatives thereof, and X is a member of the group consisting of oxygen, sulfur, selenium and tellurium, and (2) polyphosphonic acids of the formula

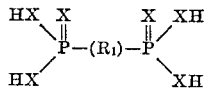

wherein $R_1$ is a member of the group consisting of bivalent hydrocarbon and heterocyclic radicals and halogen, ether and ester substituted derivatives thereof, and X is a member of the group consisting of oxygen, sulfur, selenium and tellurium.

2. A hard infusible product obtained by heating the resinous product defined in claim 1 with a cross-linking agent.

3. A phosphorus-containing resinous product obtained by heating a polyepoxide containing only carbon, hydrogen, oxygen and chlorine and having an epoxy equivalency of greater than 1.0 with a phosphonic acid of the group consisting of hydrocarbon-substituted phosphonic acids and halohydrocarbon-substituted phosphonic acids.

4. A phosphorus-containing resinous product obtained by heating at a temperature between 65° C. and 200° C. a glycidyl polyether of a polyhydric phenol having an epoxy equivalency greater than 1.0 with up to an equivalent amount of an aryl phosphonic acid.

5. A hard infusible product obtained by heating the resinous product defined in claim 4 with a cross-linking agent consisting of a diisocyanate.

6. A high molecular weight phosphorous-containing resinous product capable of being melt spun into fibers obtained by heating at a temperature between 65° C. and 200° C. a glycidyl polyether of a dihydric phenol having an epoxy equivalency between 1.1 and 2.5 and a molecular weight between 200 and 800 with an aryl phosphon acid in an equivalent ratio varying from 4:1 to 1:1.

7. A sulfur- and phosphorus-containing resinous product obtained by heating at a temperature between 65° C. and 200° C. a polyglycidyl polythioether with a hydrocarbon-substituted phosphonic acid in an equivalent ratio varying from 4:1 to 1:1.

8. A phosphorus-containing resinous product obtained by reacting a glycidyl polyether of 2,2-bis(4-hydroxyphenyl)propane having an epoxy equivalency greater than 1.0 and a molecular weight between 200 and 800 with an aryl-substituted phosphonic acid in an equivalent ratio varying between 4:1 and 1.4 at a temperature between 65° C. and 200° C.

9. A phosphorus-containing resinous product obtained by reacting a mixture of a glycidyl polyether of 2,2'-bis(4-hydroxyphenyl)propane having an epoxy equivalency greater than 1.0 and poly(allyl glycidyl ether) with an aryl-substituted phosphonic acid in an equivalent ratio varying between 4:1 and 1:4 at a temperature between 65° C. and 200° C.

10. A phosphorus-containing resinous product obtained by heating at a temperature between 65° C. and 200° C. a glycidyl polyether of 2,2'-bis(4-hydroxyphenyl)propane having an epoxy equivalency between 1.1 and 2.5 and a molecular weight between 200 and 800 with benzenephosphonic acid in an equivalent ratio varying from 4:1 to 1:4.

11. A phosphorus-containing resinous product obtained by heating at a temperature between 65° C. and 200° C. hydroquinone diglycidyl ether with benzenephosphonic acid in an equivalent ratio varying from 4:1 to 1:4.

12. A phosphorus-containing resinous product obtained by heating at a temperature between 65° C. and 200° C. polyepoxide with a cycloalkane phosphonic acid in an equivalent ratio varying from 4:1 to 1:4.

13. A phosphorus-containing resinous product obtained by heating at a temperature between 65° C. and 200° C. a halogen-containing glycidyl polyether of glycerol having an epoxy equivalency between 1.1 and 2.5 and a molecular weight between 200 and 800 with benzenephosphonic acid in an equivalent ratio varying from 4:1 to 1:4.

14. A hard infusible product obtained by heating the resinous product of claim 11 with a diisocyanate.

15. A process comprising heating at a temperature between 65° C. and 200° C. a polyepoxide with a phosphonic acid group consisting of (1) monophosphonic acids of the formula

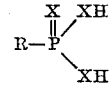

wherein R is a member of the group consisting of monovalent hydrocarbon and heterocyclic radicals and halogen, ether and ester substituted derivatives thereof, and X is a member of the group consisting of oxygen, sulfur, selenium and tellurium, and (2) polyphosphonic acids of the formula

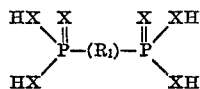

wherein $R_1$ is a member of the group consisting of bivalent hydrocarbon and heterocyclic radicals and halogen, ether and ester substituted derivatives thereof, and X is a member of the group consisting of oxygen, sulfur, selenium and tellurium.

16. A process comprising reacting a glycidyl polyether of a polyhydric phenol having an epoxy equivalency greater than 1.0 with up to an equivalent amount of a phosphonic acid of the group consisting of hydrocarbon-substituted phosphonic acids and halohydrocarbon-substituted phosphonic acids at a temperature between 65° C. and 200° C.

17. A process for forming resinous products capable of being drawn into fibers comprising reacting a glycidyl polyether of 2,2-bis(4-hydroxyphenyl)propane having an epoxy equivalency between 1.0 and 2.5 and a molecular weight between 200 and 800 with an aryl phosphonic acid in an equivalent ratio varying from 4:1 to 1:4 at a temperature between 65° C. and 200° C.

18. A process comprising reacting a polyepoxide with benzenephosphonic acid in an equivalent ratio varying from 4:1 to 1:4 at a temperature between 65° C. and 200° C.

References Cited in the file of this patent

UNITED STATES PATENTS

| | | |
|---|---|---|
| 2,670,367 | Lewis et al. | Feb. 23, 1954 |
| 2,686,771 | Whitehill et al. | Aug. 17, 1954 |